(12) United States Patent
Yonezawa

(10) Patent No.: US 9,612,425 B2
(45) Date of Patent: Apr. 4, 2017

(54) REAR ATTACHMENT LENS

(71) Applicant: FUJIFILM Corporation, Tokyo (JP)

(72) Inventor: Masaru Yonezawa, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 3 days.

(21) Appl. No.: 14/709,812

(22) Filed: May 12, 2015

(65) Prior Publication Data

US 2015/0346465 A1 Dec. 3, 2015

(30) Foreign Application Priority Data

May 28, 2014 (JP) .................. 2014-109745

(51) Int. Cl.
| | |
|---|---|
| *G02B 15/12* | (2006.01) |
| *G02B 15/02* | (2006.01) |
| *G02B 9/60* | (2006.01) |

(52) U.S. Cl.
CPC ............... *G02B 15/12* (2013.01); *G02B 9/60* (2013.01); *G02B 15/02* (2013.01)

(58) Field of Classification Search
CPC ........ G02B 15/02; G02B 15/04; G02B 15/08; G02B 15/12; G02B 9/60; G02B 9/62; G02B 9/64
USPC .................................. 359/672, 675
See application file for complete search history.

(56) References Cited

U.S. PATENT DOCUMENTS

| | | | | |
|---|---|---|---|---|
| 4,340,279 | A * | 7/1982 | Ikemori | .................. G02B 15/10 |
| | | | | 359/675 |
| 6,288,847 | B1 * | 9/2001 | Tsutsumi | ............... G02B 15/10 |
| | | | | 359/675 |
| 2009/0080087 | A1 | 3/2009 | Yamada et al. | |
| 2011/0080647 | A1 | 4/2011 | Sugita et al. | |
| 2011/0141573 | A1 * | 6/2011 | Eguchi | ................... G02B 15/10 |
| | | | | 359/675 |
| 2013/0064532 | A1 * | 3/2013 | Caldwell | .............. G02B 15/177 |
| | | | | 396/71 |
| 2015/0212303 | A1 * | 7/2015 | Ohashi | ............... G02B 27/0062 |
| | | | | 348/240.3 |

FOREIGN PATENT DOCUMENTS

| | | |
|---|---|---|
| JP | 2009-080176 | 4/2009 |
| JP | 2012-247450 | 12/2012 |
| JP | 5350202 | 11/2013 |

* cited by examiner

*Primary Examiner* — Jordan Schwartz
(74) *Attorney, Agent, or Firm* — Young & Thompson

(57) ABSTRACT

A rear attachment lens changes a focal-length of an entire lens-system, in which the rear attachment lens has been attached to a main-lens, to a longer focal-length-side than a focal-length of the main-lens by being attached to an image-side of the main-lens. The rear attachment lens consists essentially of a first-lens-group and a second-lens-group in this order from an object-side. The first-lens-group consists essentially of a negative lens and a positive lens in this order from the object-side. The second-lens-group consists essentially of at least one negative lens and at least one positive lens, and a lens closest to an image-side in the second lens-group is a positive lens. When an Abbe number for d-line and a partial dispersion ratio between g-line and F-line of the negative lens in the first-lens-group are $\nu d1$ and $\theta gF1$, respectively, conditional expression (1): $\nu d1 > 62$ and conditional expression (2): $0.64 < \theta gF1 + 0.001625 \times \nu d1 < 0.69$ are satisfied.

20 Claims, 8 Drawing Sheets

REAR ATTACHMENT LENS

CROSS-REFERENCE TO RELATED APPLICATIONS

The present application claims priority under 35 U.S.C. §119 to Japanese Patent Application No. 2014-109745, filed on May 28, 2014. The above application is hereby expressly incorporated by reference, in its entirety, into the present application.

BACKGROUND OF THE INVENTION

Field of the Invention

The present invention relates to a rear attachment lens, and particularly to a rear attachment lens that changes the focal length of an entire lens system, in which the rear attachment lens has been attached to an imaging lens, to a longer focal length side than the focal length of this imaging lens by being attached to an image side of the imaging lens.

Description of the Related Art

Conventionally, in the fields of cameras for broadcasting and the like, various rear attachment lenses that change the focal length of an entire lens system, in which the rear attachment lens has been attached to a main lens for imaging, to a longer focal length side than the focal length of the main lens by being detachably attached between the main lens and an image plane were proposed. For example, Japanese Unexamined Patent Publication No. 2012-247450 (Patent Document 1), Japanese Patent No. 5350202 (Patent Document 2), and Japanese Unexamined Patent Publication No. 2009-080176 (Patent Document 3) disclose rear attachment lenses or rear converter lenses that have ratios of increasing magnification (a ratio of the focal length of an entire system, in which a rear attachment lens or rear converter lens has been attached to a main lens, to the focal length of the main lens alone) of about 2 times.

SUMMARY OF THE INVENTION

Generally, cameras for broadcasting require relatively high resolutions. As the pixel number of imaging devices mounted on cameras increased in recent years, high-performance rear attachment lenses that can cope with an increase in pixel numbers of recent years and obtain high resolution images have become needed. However, in the rear attachment lenses disclosed in Patent Documents 1 through 3, correction of a longitudinal chromatic aberration is insufficient to cope with an increase in pixel numbers of recent years. Therefore, further improvement is needed.

In view of the foregoing circumstances, it is an object of the present invention to provide a rear attachment lens having high optical performance to be able to cope with an increase in pixel numbers of recent years, and in which various aberrations, such as chromatic aberrations, are excellently corrected while having an action of increasing the focal length of an entire lens system by being attached to a main lens.

A rear attachment lens of the present invention is a rear attachment lens attachable to a main lens, which is an imaging optical system, and changes a focal length of an entire lens system, in which the rear attachment lens has been attached to the main lens, to a longer focal length side than a focal length of the main lens by being attached to an image side of the main lens. The rear attachment lens consists essentially of a first lens group and a second lens group in this order from an object side. The first lens group consists essentially of a negative lens and a positive lens in this order from the object side. The second lens group consists essentially of at least one negative lens and at least one positive lens, and a lens closest to an image side in the second lens group is a positive lens. When an Abbe number for d-line and a partial dispersion ratio between g-line and F-line of the negative lens in the first lens group are $vd1$ and $\theta gF1$, respectively, the following conditional expressions (1) and (2) are satisfied:

$$vd1 > 62 \quad (1);$$

and $$0.64 < \theta gF1 + 0.001625 \times vd1 < 0.69 \quad (2).$$

In the present invention, it is desirable that the following conditional expression (2-1) is satisfied:

$$0.64 < \theta gF1 + 0.001625 \times vd1 < 0.675 \quad (2\text{-}1).$$

Further, when a refractive index for d-line of the negative lens in the first lens group is $Nd1$ and a refractive index for d-line of the positive lens in the first lens group is $Nd2$, it is desirable that the following conditional expression (3) is satisfied:

$$Nd1 - Nd2 > 0 \quad (3).$$

It is desirable that the negative lens in the first lens group and the positive lens in the first lens group are cemented together.

Further, when an Abbe number for d-line and a partial dispersion ratio between g-line and F-line of a positive lens included in the second lens group are $vd2p$ and $\theta gF2p$, respectively, it is desirable that at least two positive lenses in the second lens group satisfy the following conditional expression (4), and it is more desirable that the following conditional expression (4-1) is satisfied:

$$0.645 < \theta gF2p + 0.001625 \times vd2p < 0.67 \quad (4);$$

and $$0.65 < \theta gF2p + 0.001625 \times vd2p < 0.66 \quad (4\text{-}1).$$

Further, when a refractive index for d-line, an Abbe number for d-line and a partial dispersion ratio between g-line and F-line of a negative lens included in the second lens group are $Nd2n$, $vd2n$ and $\theta gF2n$, respectively, it is desirable that at least two negative lenses in the second lens group satisfy both of the following conditional expressions (5) and (6), and it is more desirable that the following both of conditional expressions (5) and (6-1) are satisfied:

$$Nd2n > 1.85 \quad (5);$$

$$0.635 < \theta gF2n + 0.001625 \times vd2n < 0.67 \quad (6);$$

and $$0.635 < \theta gF2n + 0.001625 \times vd2n < 0.66 \quad (6\text{-}1).$$

In the present invention, it is desirable that one of a first lens and a second lens from the object side in the second lens group is a negative lens and the other one is a positive lens, and that the first lens and the second lens from the object side in the second lens group are cemented together and constitute a cemented lens having negative refractive power as a whole.

Further, when a refractive index for d-line of a negative lens closest to the object side in the second lens group is Nd3 and a refractive index for d-line of a positive lens closest to the object side in the second lens group is Nd4, it is desirable that the following conditional expression (7) is satisfied, and it is more desirable that the following conditional expression (7-1) is satisfied:

$$Nd3-Nd4>0 \quad (7);$$

and $$Nd3-Nd4>0.2 \quad (7\text{-}1).$$

It is desirable that a second lens from the image side in the second lens group is a negative meniscus lens with its convex surface facing the image side. It is desirable that a lens closest to the image side in the second lens group is a positive meniscus lens with its convex surface facing the image side.

Further, when a length on an optical axis from a lens surface closest to the object side in the second lens group to an image-side lens surface of a second lens from the image side in the second lens group is Da and a length on an optical axis from a lens surface closest to the object side in the second lens group to a lens surface closest to the image side in the second lens group is Db, it is desirable that the following conditional expression (8) is satisfied, and it is more desirable that the following conditional expression (8-1) is satisfied:

$$0.55<Da/Db<0.70 \quad (8);$$

and $$0.60<Da/Db<0.65 \quad (8\text{-}1).$$

In the rear attachment lens of the present invention, the second lens group may consist essentially of four negative lenses and four positive lenses.

Further, it is desirable that the second lens group includes a three-element cemented lens having negative refractive power, as a whole, in which a negative lens, a positive lens and a negative lens are cemented together in this order from the object side.

Further, in the rear attachment lens of the present invention, the second lens group may consist essentially of a cemented lens of two lenses cemented together, and one of which is a negative lens, and the other one of which is a positive lens, a cemented lens of two lenses cemented together, and one of which is a negative lens, and the other one of which is a positive lens, a three-element cemented lens of a negative lens, a positive lens and a negative lens cemented together in this order from the object side, and a positive lens in this order from the object side. When the second lens group is configured in this manner, it is desirable that each of the first cemented lens and the second cemented lens from the object side in the second lens group is a cemented lens of a negative lens and a positive lens cemented together in this order from the object side.

Here, the term "essentially" in the expression "consists essentially of" means that lenses substantially without any refractive power, optical elements other than lenses, such as a stop, a cover glass and filters, mechanical parts, such as a lens flange, a lens barrel and a hand shake blur correction mechanism, and the like may be included in addition to the mentioned composition elements.

The surface shape and the sign of the refractive power of a lens in the rear attachment lens of the present invention are considered in a paraxial region when the lens includes an aspheric surface.

Meanwhile, partial dispersion ratio θgF between g-line and F-line of a lens is defined by θgF=(Ng−NF)/(NF−NC) when refractive indices of the lens for g-line, F-line and C-line are Ng, NF and NC, respectively.

According to the present invention, in a rear attachment lens consisting essentially of two groups, the configuration of lenses included in each of the lens groups is appropriately set, and especially, the material of lenses is set so as to satisfy predetermined conditional expressions. Therefore, it is possible to provide a rear attachment lens having high optical performance to be able to cope with an increase in pixel numbers of recent years, and in which various aberrations, such as chromatic aberrations, are excellently corrected while having an action of increasing the focal length of an entire lens system by being attached to a main lens.

DESCRIPTION OF THE PREFERRED EMBODIMENTS

Hereinafter, embodiments of the present invention will be described in detail with reference to drawings.

Figure 1:
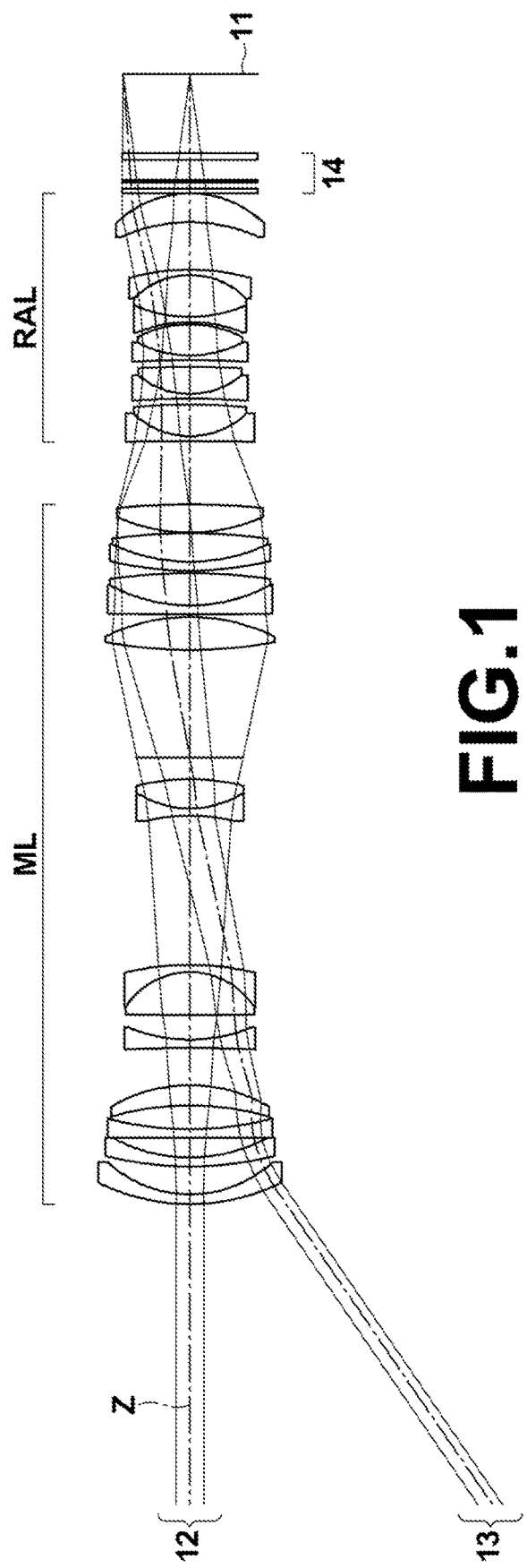
FIG. 1 is a cross section illustrating configuration and optical paths in a state in which a rear attachment lens according to an embodiment of the present invention is attached to a main lens.
Figure 2:
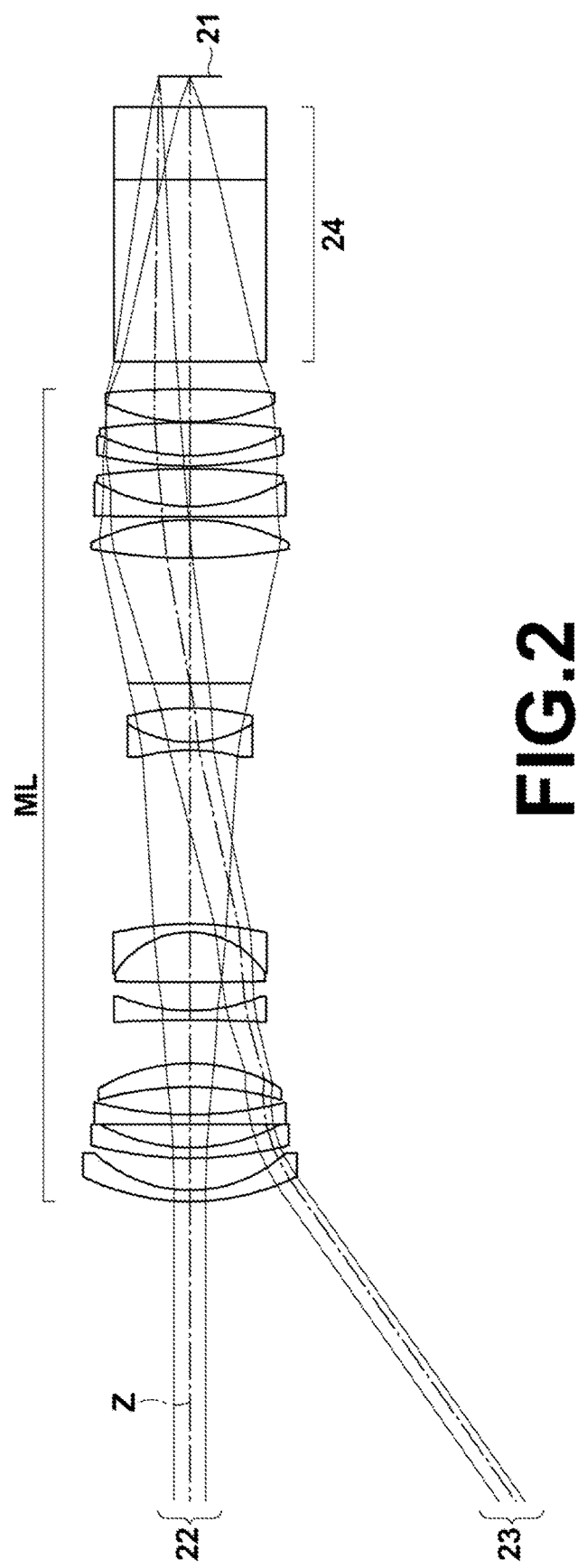
FIG. 2 is a cross section illustrating the configuration of the main lens illustrated in FIG. 1 and optical paths.
Figure 3:
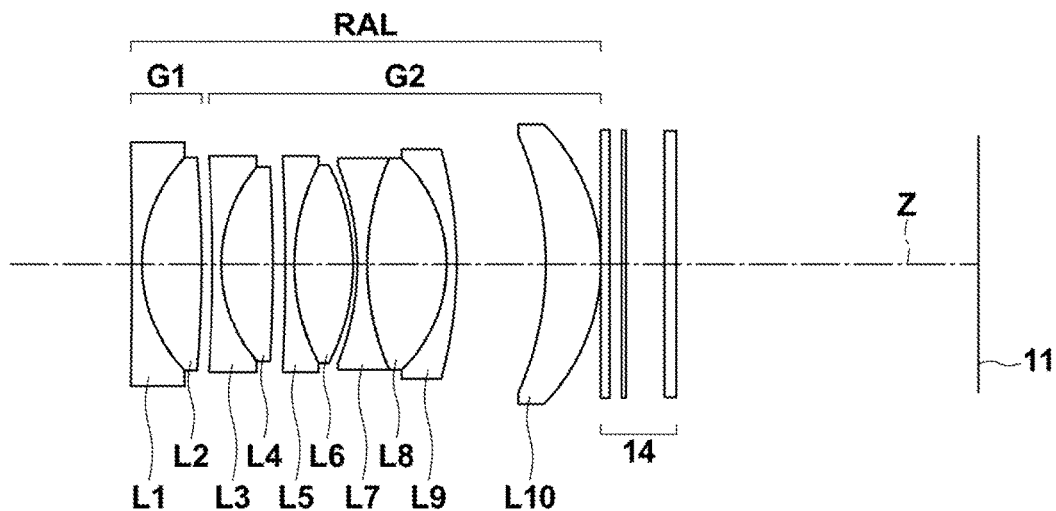
FIG. 3 is a cross section illustrating the configuration of a rear attachment lens in Example 1 of the present invention.

FIG. 1 is a cross section illustrating configuration in a state in which rear attachment lens RAL according to an embodiment of the present invention is attached to an image side of main lens (also referred to as a master lens) ML. FIG. 2 is a cross section illustrating configuration in a state in which rear attachment lens RAL is not attached to the image side of main lens ML. FIG. 3 is a cross section illustrating the configuration of rear attachment lens RAL illustrated in FIG. 1. Rear attachment lens RAL in the example illustrated in FIG. 3 corresponds to Example 1, which will be described later. In FIG. 1 through FIG. 3, the left side of a diagram is an object side, and the right side of the diagram is an image side. In FIG. 1, axial rays 12 from an object at infinity and off-axial rays 13 at a maximum angle of view are also illustrated. In FIG. 2, axial rays 22 from an object at infinity and off-axial rays 23 at a maximum angle of view are also illustrated.

This rear attachment lens RAL changes the focal length of an entire lens system (a combined optical system of main lens ML and rear attachment lens RAL) to a longer focal length side than the focal length of main lens ML by being attached to an image side of main lens ML. Main lens ML is an imaging optical system mountable on an imaging apparatus, for example, such as a camera for broadcasting, a video camera and a digital camera.

Rear attachment lens RAL may have a function of increasing an image size of an entire lens system, in which rear attachment lens RAL has been attached to main lens ML, than an image size of main lens ML by being attached to the image side of main lens ML. As a fact that the size of an image plane 11 illustrated in FIG. 1 is larger than the size of an image plane 21 illustrated in FIG. 2 shows, rear attachment lens RAL according to an embodiment of the present invention has a function of increasing an image size.

When an imaging lens system is mounted on an imaging apparatus, it is conceivable to configure the imaging apparatus in such a manner to include a cover glass for protecting an imaging device, a prism corresponding to the specification of the imaging apparatus, and various filters, such as a low-pass filter and an infrared-ray-cut filter. Therefore, FIG. 1 and FIG. 3 illustrate an example in which plural parallel-flat-plate-shaped optical members 14 are arranged between rear attachment lens RAL and the image plane 11. FIG. 2 illustrates an example in which an optical member 24 is arranged between main lens ML and the image plane 21, and an incident surface and an exit surface of the optical member 24 are flat surfaces parallel to each other. Here, the configuration may omit optical members 14, 24.

As illustrated in FIG. 3, rear attachment lens RAL consists essentially of first lens group G1 and second lens group G2 along optical axis Z from the object side, which is the main lens side. In the example illustrated in FIG. 3, first lens group G1 consists of two lenses of negative lens L1 and positive lens L2 in this order from the object side. Second lens group G2 consists of eight lenses of negative lens L3, positive lens L4, negative lens L5, positive lens L6, negative lens L7, positive lens L8, negative lens L9 and positive lens L10 in this order from the object side. Lens L1 and lens L2 are cemented together. Lens L3 and lens L4 are cemented together. Lens L5 and lens L6 are cemented together. Lens L7, lens L8 and lens L9 are cemented together. However, second lens group G2 in the rear attachment lens of the present invention may adopt configuration other than the example illustrated in FIG. 3 with respect to the number of lenses and the order of arrangement of positive lenses and negative lenses.

First lens group G1 in this rear attachment lens RAL consists essentially of negative lens L1 and positive lens L2 in this order from the object side. This configuration is advantageous to excellent correction of a secondary spectrum. Further, it is possible to effectively increase the focal length by arranging the negative lens closest to the main lens in rear attachment lens RAL. It is possible to excellently correct curvature of field by arranging the positive lens, as the second lens from the object side in first lens group G1, and the configuration is advantageous to increasing an image size.

Further, when an Abbe number for d-line and a partial dispersion ratio between g-line and F-line of negative lens L1 in first lens group G1 are $vd1$ and $\theta gF1$, respectively, first lens group G1 is configured to satisfy the following conditional expressions (1) and (2):

$$vd1 > 62 \quad (1);$$

and $$0.64 < \theta gF1 + 0.001625 \times vd1 < 0.69 \quad (2).$$

It is possible to excellently correct a longitudinal chromatic aberration by selecting a material satisfying conditional expression (1).

It is possible to prevent over-correction of a secondary spectrum by selecting a material in such a manner that the value does not exceed the upper limit of conditional expression (2). It is possible to prevent under-correction of a secondary spectrum by selecting a material in such a manner that the value is not lower than the lower limit of conditional expression (2). Therefore, it is possible to excellently correct a secondary spectrum by selecting a material satisfying conditional expression (2). It is more desirable that the following conditional expression (2-1) is satisfied to more excellently correct the secondary spectrum:

$$0.64 < \theta gF1 + 0.001625 \times vd1 < 0.675 \quad (2-1).$$

Further, when a refractive index for d-line of negative lens L1 in first lens group G1 is $Nd1$ and a refractive index for d-line of positive lens L2 in first lens group G1 is $Nd2$, it is desirable that the following conditional expression (3) is satisfied:

$$Nd1 - Nd2 > 0 \quad (3).$$

It is possible to excellently correct curvature of field by selecting a material satisfying conditional expression (3), and the configuration is advantageous to increasing an image size.

Here, it is desirable that negative lens L1 and positive lens L2 in first lens group G1 are cemented together. In such a case, it is possible to more excellently correct the secondary spectrum.

Second lens group G2 in this rear attachment lens RAL consists essentially of at least one negative lens and at least one positive lens. This configuration can easily obtain an action of increasing the focal length while suppressing generation of various aberrations, such as chromatic aberrations.

Second lens group G2 is configured in such a manner that a lens closest to the image side in second lens group G2 is a positive lens. Since rear attachment lens RAL having an action of increasing the focal length has strong negative refractive power, as a whole, a Petzval sum tends to be over-corrected. However, it is possible to suppress this tendency of Petzval sum by arranging a positive lens in second lens group G2. Especially, when a positive lens is arranged closest to the image side in second lens group G2, the configuration is advantageous to excellent correction of curvature of field. Meanwhile, the height of an off-axial chief ray is high at a position close to an image plane. It is possible to suppress distortion generated by negative refractive power by arranging a positive lens closest to the image side in second lens group G2, where the height of this off-axial chief ray is high. Further, it is possible to excellently correct distortion. Therefore, the configuration is advantageous to increasing an image size. Further, it is possible to suppress the incident angle of an off-axial chief ray entering the image plane so that the incident angle is small by arranging a positive lens closest to the image side in second lens group G2.

Further, in this rear attachment lens RAL, when an Abbe number for d-line and a partial dispersion ratio between g-line and F-line of a positive lens included in second lens group G2 are vd2p and θgF2p, respectively, it is desirable that second lens group G2 includes at least two positive lenses satisfying the following conditional expression (4):

$$0.645 < \theta gF2p + 0.001625 \times vd2p < 0.67 \quad (4).$$

It is possible to prevent under-correction of a secondary spectrum by selecting a material in such a manner that the value does not exceed the upper limit of conditional expression (4). It is possible to prevent over-correction of a secondary spectrum by selecting a material in such a manner that the value is not lower than the lower limit of conditional expression (4). Therefore, it is possible to excellently correct a secondary spectrum by selecting a material satisfying conditional expression (4). It is more desirable that the following conditional expression (4-1) is satisfied, instead of conditional expression (4), to more excellently correct the secondary spectrum:

$$0.65 < \theta gF2p + 0.001625 \times vd2p < 0.66 \quad (4-1).$$

When second lens group G2 is configured to include at least two positive lenses, it is possible to suppress over-correction of a Petzval sum in rear attachment lens RAL, which tends to be configured to have strong negative refractive power as a whole. Further, it is possible to excellently correct curvature of field. The configuration is advantageous to increasing an image size.

Further, in this rear attachment lens RAL, when a refractive index for d-line, an Abbe number for d-line and a partial dispersion ratio between g-line and F-line of a negative lens included in second lens group G2 are Nd2n, vd2n and θgF2n, respectively, it is desirable that second lens group G2 includes at least two negative lenses satisfying both of the following conditional expressions (5) and (6):

$$Nd2n > 1.85 \quad (5);$$

and $$0.635 < \theta gF2n + 0.001625 \times vd2n < 0.67 \quad (6).$$

It is possible to excellently correct curvature of field by selecting a material satisfying conditional expression (5), and the configuration is advantageous to increasing an image size.

It is possible to prevent over-correction of a secondary spectrum by selecting a material in such a manner that the value does not exceed the upper limit of conditional expression (6). It is possible to prevent under-correction of a secondary spectrum by selecting a material in such a manner that the value is not lower than the lower limit of conditional expression (6). Therefore, it is possible to excellently correct a secondary spectrum by selecting a material satisfying conditional expression (6). It is more desirable that the following conditional expression (6-1) is satisfied, instead of conditional expression (6), to more excellently correct the secondary spectrum:

$$0.635 < \theta gF2n + 0.001625 \times vd2n < 0.66 \quad (6-1)$$

When second lens group G2 is configured to include at least two negative lenses, it is possible to easily secure negative refractive power, and to achieve an action of increasing the focal length.

It is desirable that one of a first lens and a second lens from the object side in second lens group G2 is a negative lens and the other one is a positive lens, and that the first lens and the second lens from the object side in second lens group G2 are cemented together and constitute a cemented lens having negative refractive power as a whole. When a cemented lens consisting of a negative lens and a positive lens is included, it is possible to excellently correct a secondary spectrum. Further, it is possible to effectively increase the focal length by arranging negative refractive power closest to the main lens in second lens group G2.

Further, when a refractive index for d-line of a negative lens closest to the object side in second lens group G2 is Nd3 and a refractive index for d-line of a positive lens closest to the object side in second lens group G2 is Nd4, it is desirable that the following conditional expression (7) is satisfied:

$$Nd3 - Nd4 > 0 \quad (7).$$

It is possible to prevent over-correction of a Petzval sum by selecting a material satisfying conditional expression (7). Further, it is possible to excellently correct curvature of field, and the configuration is advantageous to increasing an image size. It is more desirable that the following conditional expression (7-1) is satisfied to enhance the effect about conditional expression (7):

$$Nd3 - Nd4 > 0.2 \quad (7-1).$$

It is desirable that a second lens from the image side in second lens group G2 is a negative meniscus lens with its convex surface facing the image side. When the second lens from the image side in second lens group G2 is a negative lens, it is possible to easily secure negative refractive power, and the configuration is advantageous to increasing the focal length. When this lens has a meniscus shape with its convex surface facing the image side, it is possible to suppress generation of astigmatism, and the configuration is advantageous to increasing an image size.

It is desirable that a lens closest to the image side in second lens group G2 is a positive meniscus lens with its convex surface facing the image side. When the lens closest to the image side in second lens group G2 has a meniscus shape with its convex surface facing the image side, it is possible to suppress generation of astigmatism. The configuration is advantageous to increasing an image size.

Further, when a length on an optical axis from a lens surface closest to the object side in second lens group G2 to an image-side lens surface of a second lens from the image side in second lens group G2 is Da and a length on an optical axis from a lens surface closest to the object side in second lens group G2 to a lens surface closest to the image side in second lens group G2 is Db, it is desirable that the following conditional expression (8) is satisfied:

$$0.55 < Da/Db < 0.70 \quad (8).$$

When second lens group G2 is configured in such a manner that the value does not exceed the upper limit of conditional expression (8), it is possible to excellently correct curvature of field and distortion. Further, it is possible to suppress an incident angle of an off-axial chief ray entering the image plane so that the incident angle is small. When second lens group G2 is configured in such a manner that the value is not lower than the lower limit of conditional expression (8), it is possible to suppress the total length of the lens system. It is more desirable that the following conditional expression (8-1) is satisfied to enhance the effect about conditional expression (8):

$$0.60 < Da/Db < 0.65 \quad (8\text{-}1).$$

Further, second lens group G2 may consist essentially of four negative lenses and four positive lenses. In such a case, it is possible to allocate a role of correcting aberrations to each one of the total of eight lenses. Therefore, it is possible to excellently correct curvature of field and chromatic aberrations. The configuration is advantageous to increasing an image size.

It is desirable that second lens group G2 includes a three-element cemented lens having negative refractive power, as a whole, in which a negative lens, a positive lens and a negative lens are cemented together in this order from the object side. When second lens group G2 includes such a three-element cemented lens, it is possible to excellently correct curvature of field and chromatic aberrations. The configuration is advantageous to increasing an image size. Further, when the three-element cemented lens has negative refractive power, that is advantageous to achieving an action of increasing the focal length.

More specifically, second lens group G2 may consist essentially of a first cemented lens of two lenses cemented together, and one of which is a negative lens, and the other one of which is a positive lens, a second cemented lens of two lenses cemented together, and one of which is a negative lens, and the other one of which is a positive lens, a three-element cemented lens of a negative lens, a positive lens and a negative lens cemented together in this order from the object side, and a positive lens in this order from the object side. When second lens group G2 is configured in this manner, it is possible to excellently correct curvature of field and chromatic aberrations. The configuration is advantageous to increasing an image size. Here, when the first cemented lens is a cemented lens of a negative lens and a positive lens cemented together in this order from the object side, the configuration is more advantageous to excellently correcting curvature of field and chromatic aberrations and increasing an image size. When the second cemented lens is a cemented lens of a negative lens and a positive lens cemented together in this order from the object side, the configuration is more advantageous to excellently correcting curvature of field and chromatic aberrations and increasing an image size.

As described above, according to the embodiments of the present invention, it is possible to realize a rear attachment lens having high optical performance to be able to cope with an increase in pixel numbers of recent years, and in which various aberrations, such as chromatic aberrations, are excellently corrected while having an action of increasing the focal length of an entire lens system by being attached to a main lens. For example, the rear attachment lens according to an embodiment of the present invention can make the focal length of an entire system about 2.5 times longer than the focal length of a main lens by being attached to the main lens.

According to the embodiments of the present invention, a rear attachment lens that has an action of increasing an image size is realizable. More specifically, for example, an imaging lens for a camera including a ⅔-inch-type imaging device is usable as a lens system for a camera including a super 35 mm equivalent imaging device by attaching a rear attachment lens according to an embodiment of the present invention to the imaging lens.

The aforementioned desirable configuration and adoptable configuration may be arbitrarily combined. It is desirable that the configuration is optionally adopted in an appropriate manner based on required specification.

Next, numerical value examples of a main lens and examples of numerical values of a rear attachment lens of the present invention will be described.

[Main Lens]

FIG. 2 is a diagram illustrating the lens configuration of a main lens. Table 1 shows basic lens data of the main lens and an optical member 24, illustrated in FIG. 2. In Table 1, a column of Si shows the surface number of an i-th (i=1, 2, 3, . . . ) surface when an object-side surface of a composition element closest to the object side is the first surface and the surface numbers sequentially increase toward the image side. A column of Ri shows the curvature radius of the i-th surface. A column of Di shows a distance, on optical axis Z, between the i-th surface and an (i+1)th surface. Here, the sign of a curvature radius is positive when a surface shape is convex toward the object side, and negative when a surface shape is convex toward the image side.

In Table 1, a column of Ndj shows the refractive index of a j-th (j=1, 2, 3, . . . ) optical element for d-line (wavelength is 587.6 nm) when a composition element closest to the object side is the first composition element and the numbers sequentially increase toward the image side. A column of νdj shows the Abbe number of the j-th optical element for d-line. A column of θgFj shows a partial dispersion ratio between g-line and F-line of the j-th optical element. In the column of surface numbers of Table 1, a surface number and the term "(St)" are written in a row of the surface number of a surface corresponding to aperture stop St, and a surface number and the term "(img)" are written in a row of the surface number of a surface corresponding to an image plane.

Table 2 shows maximum image height IH, focal length f, back focus Bf, F-number FNo., and maximum full angle 2ω of view in a state of being focused on an object at infinity, as the specification of the main lens illustrated in FIG. 2. Here, Bf is a value representing an air-equivalent length from a lens surface closest to the image side in the main lens to an image plane. Table 2 shows values for d-line.

In each of the following tables, degrees are used as the unit of angles, and mm is used as the unit of lengths. However, since an optical system is usable by being proportionally enlarged or proportionally reduced, other appropriate units may be used. Further, each of the following tables shows numerical values rounded at predetermined digits.

TABLE 1

| MAIN LENS | | | | | |
|---|---|---|---|---|---|
| Si | Ri | Di | Ndj | νdj | θgFj |
| 1 | 43.21169 | 2.020 | 1.83481 | 42.71 | 0.56369 |
| 2 | 25.38150 | 5.870 | | | |
| 3 | 71.17674 | 1.910 | 1.80400 | 46.57 | 0.55724 |
| 4 | 33.78610 | 4.150 | | | |
| 5 | ∞ | 1.810 | 1.80610 | 40.92 | 0.57019 |
| 6 | 67.24063 | 5.000 | | | |
| 7 | −59.16379 | 4.290 | 1.80440 | 39.59 | 0.57297 |
| 8 | −32.05528 | 7.870 | | | |
| 9 | −255.60099 | 1.710 | 1.49700 | 81.54 | 0.53758 |
| 10 | 33.10749 | 5.170 | | | |
| 11 | 606.15871 | 9.060 | 1.54814 | 45.79 | 0.56859 |
| 12 | −15.97500 | 1.510 | 1.49700 | 81.54 | 0.53758 |
| 13 | −59.19645 | 31.510 | | | |

TABLE 1-continued

MAIN LENS

| Si | Ri | Di | Ndj | vdj | θgFj |
|---|---|---|---|---|---|
| 14 | -35.76696 | 1.500 | 1.83481 | 42.71 | 0.56369 |
| 15 | 20.66000 | 6.180 | 1.67270 | 32.10 | 0.59891 |
| 16 | -43.39848 | 4.510 | | | |
| 17(St) | ∞ | 22.700 | | | |
| 18 | 95.57082 | 6.980 | 1.48749 | 70.23 | 0.53007 |
| 19 | -39.89468 | 0.510 | | | |
| 20 | 972.70363 | 1.900 | 1.88300 | 40.76 | 0.56679 |
| 21 | 34.68500 | 6.830 | 1.49700 | 81.54 | 0.53758 |
| 22 | -112.04784 | 0.500 | | | |
| 23 | 69.69803 | 1.900 | 1.88300 | 40.76 | 0.56679 |
| 24 | 38.24000 | 6.000 | 1.49700 | 81.54 | 0.53758 |
| 25 | -121.26988 | 0.120 | | | |
| 26 | 36.51943 | 5.920 | 1.49700 | 81.54 | 0.53758 |
| 27 | -174.02247 | 5.000 | | | |
| 28 | ∞ | 33.000 | 1.60859 | 46.44 | 0.56664 |
| 29 | ∞ | 13.200 | 1.51680 | 64.17 | 0.53495 |
| 30 | ∞ | 5.535 | | | |
| 31(img) | ∞ | | | | |

TABLE 2

MAIN LENS

| IH | 5.600 |
|---|---|
| f | 8.252 |
| Bf | 39.753 |
| FNo. | 1.44 |
| 2ω | 69.8 |

Figure 6:
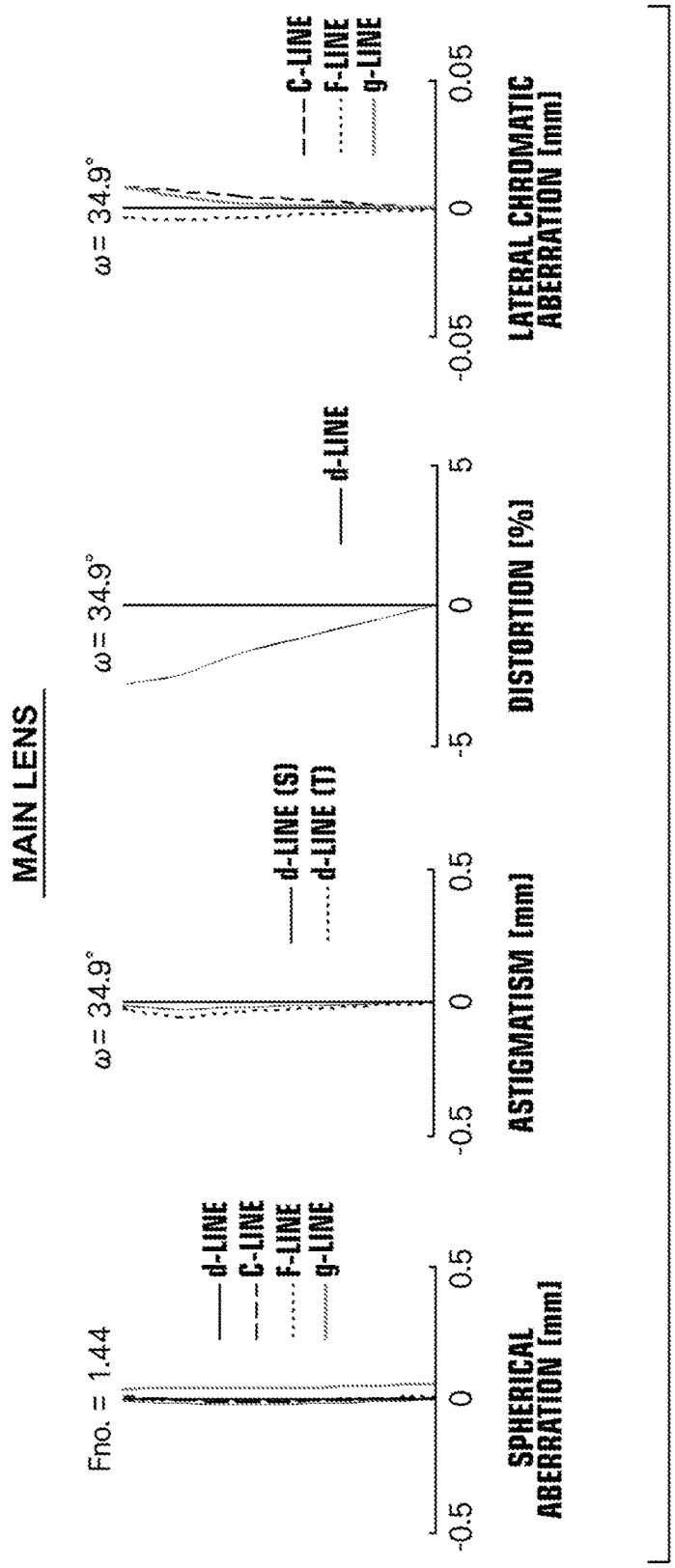
FIG. 6 is aberration diagrams illustrating various aberrations of the main lens illustrated in FIG. 2, which are a spherical aberration, astigmatism, distortion and a lateral chromatic aberration in this order from the left side of paper.

FIG. 6 illustrates aberration diagrams of this main lens. FIG. 6 illustrates a spherical aberration diagram, an astigmatism diagram, a distortion diagram and a lateral chromatic aberration diagram in this order from the left side of paper. The spherical aberration diagram illustrates aberrations for d-line, C-line (wavelength is 656.3 nm), F-line (wavelength is 486.1 nm) and g-line (wavelength is 435.8 nm) by a black solid line, a long broken line, a short broken line and a gray solid line, respectively. The astigmatism diagram illustrates an aberration for d-line in a sagittal direction and an aberration for d-line in a tangential direction by a solid line and a short broken line, respectively. The distortion diagram illustrates an aberration for d-line by a solid line. The lateral chromatic aberration diagram illustrates aberrations for C-line, F-line and g-line by a long broken line, a short broken line and a gray solid line, respectively. In the spherical aberration diagram, Fno. means an F-number, and in the other diagrams, ω means a half value (half angle of view) of a maximum full angle of view in a state of being focused on an object at infinity.

Example 1

FIG. 3 is a diagram illustrating the configuration of a rear attachment lens in Example 1. Since the lens configuration of the rear attachment lens in Example 1 has been described already, redundant explanation will be omitted here. Table 3 shows basic lens data of the rear attachment lens in Example 1 and an optical member 14. The signs and the description method used in Table 3 are basically similar to those used in Table 1. Table 4 shows maximum image height LH, focal length f, back focus Bf, F-number FNo., maximum full angle 2ω of view in a state of being focused on an object at infinity, a ratio of increasing magnification, and a distance between a main lens and a rear attachment lens (a length on an optical axis from a lens surface closest to the image side in the main lens to a lens surface closest to the object side in the rear attachment lens), as the specification of a lens system in which the rear attachment lens in Example 1 has been attached to the image side of the main lens. Here, Bf is a value representing an air-equivalent length from a lens surface closest to the image side in the rear attachment lens to an image plane in a lens system in which the rear attachment lens has been attached to the image side of the main lens.

TABLE 3

EXAMPLE 1

| Si | Ri | Di | Ndj | Ndj | θgFj |
|---|---|---|---|---|---|
| 1 | -619.44564 | 1.110 | 1.59282 | 68.63 | 0.54414 |
| 2 | 17.07100 | 6.625 | 1.56732 | 42.82 | 0.57309 |
| 3 | -139.59713 | 1.250 | | | |
| 4 | -178.95748 | 1.010 | 2.00069 | 25.46 | 0.61364 |
| 5 | 16.66600 | 5.725 | 1.75211 | 25.05 | 0.61924 |
| 6 | -213.72947 | 1.400 | | | |
| 7 | -246.41032 | 1.010 | 2.00100 | 29.13 | 0.59952 |
| 8 | 23.69800 | 6.533 | 1.59270 | 35.31 | 0.59336 |
| 9 | -23.69800 | 0.469 | | | |
| 10 | -29.23100 | 1.110 | 1.71299 | 53.87 | 0.54587 |
| 11 | 29.23100 | 8.838 | 1.59270 | 35.31 | 0.59336 |
| 12 | -16.29000 | 1.108 | 1.80400 | 46.58 | 0.55730 |
| 13 | -47.75793 | 10.000 | | | |
| 14 | -34.75332 | 6.114 | 1.51633 | 64.14 | 0.53531 |
| 15 | -22.13736 | 0.000 | | | |
| 16 | ∞ | 1.000 | 1.51680 | 64.20 | 0.53430 |
| 17 | ∞ | 1.300 | | | |
| 18 | ∞ | 0.500 | 1.51680 | 64.20 | 0.53430 |
| 19 | ∞ | 4.300 | | | |
| 20 | ∞ | 1.300 | 1.51680 | 64.20 | 0.53430 |
| 21 | ∞ | | | | |

TABLE 4

MAIN LENS + EXAMPLE 1

| IH | 14.040 |
|---|---|
| f | 21.026 |
| Bf | 24.195 |
| FNo. | 3.67 |
| 2ω | 68.6 |
| RATIO OF INCREASING MAGNIFICATION | 2.548 |
| DISTANCE BETWEEN MAIN LENS AND REAR ATTACHMENT LENS | 13.323 |

Figure 7:
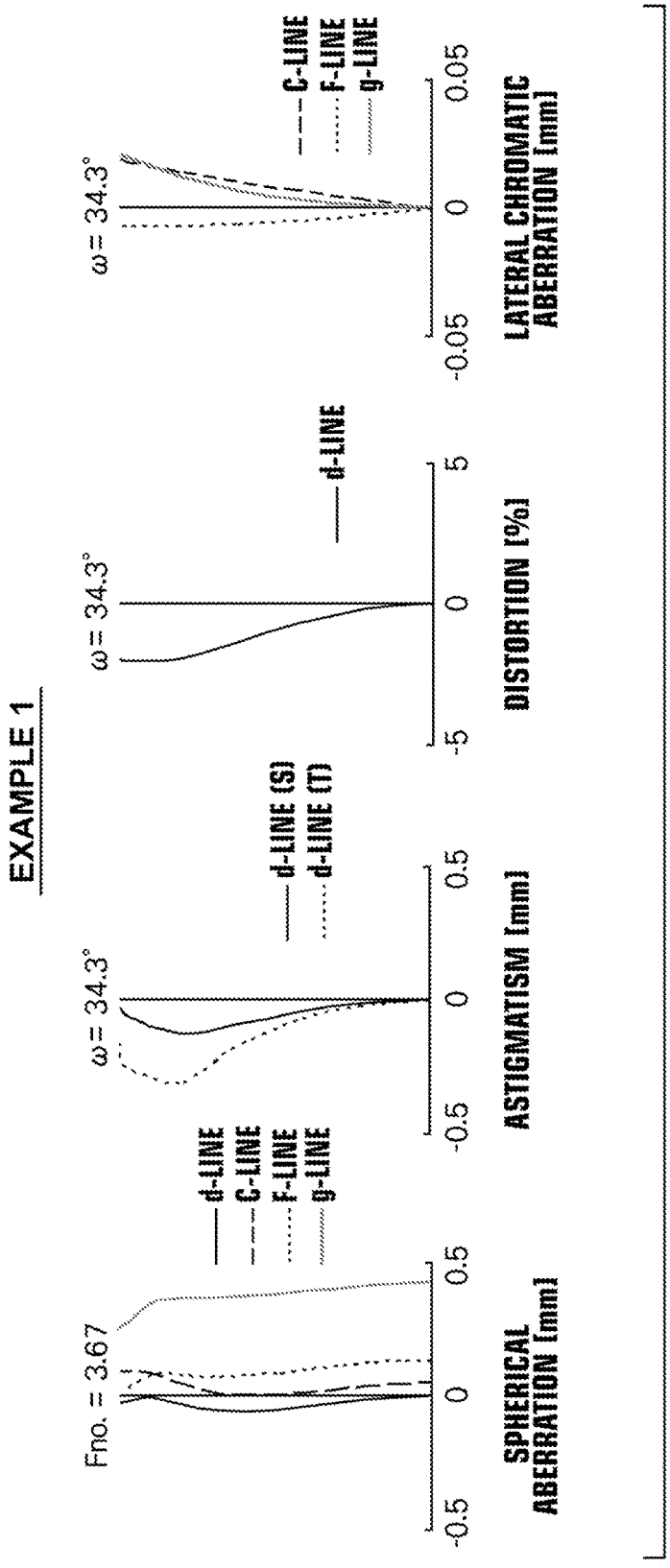
FIG. 7 is aberration diagrams illustrating various aberrations of a lens system in which the rear attachment lens in Example 1 of the present invention has been attached to the main lens, which are a spherical aberration, astigmatism, distortion and a lateral chromatic aberration in this order from the left side of paper.

FIG. 7 illustrates aberration diagrams of a lens system in which the rear attachment lens in Example 1 and the optical member 14, shown in Table 3, are attached to the image side of the main lens. FIG. 7 illustrates a spherical aberration diagram, an astigmatism diagram, a distortion diagram and a lateral chromatic aberration diagram in this order from the left side of paper. The signs, the description method and the like used in FIG. 7 are basically similar to those used in FIG. 6.

The illustration method, the signs, the meanings and the description method of each data, and the like described about the rear attachment lens in Example 1 are similar also in the following examples, unless otherwise stated. Therefore, redundant explanation will be omitted.

Example 2

Figure 4:
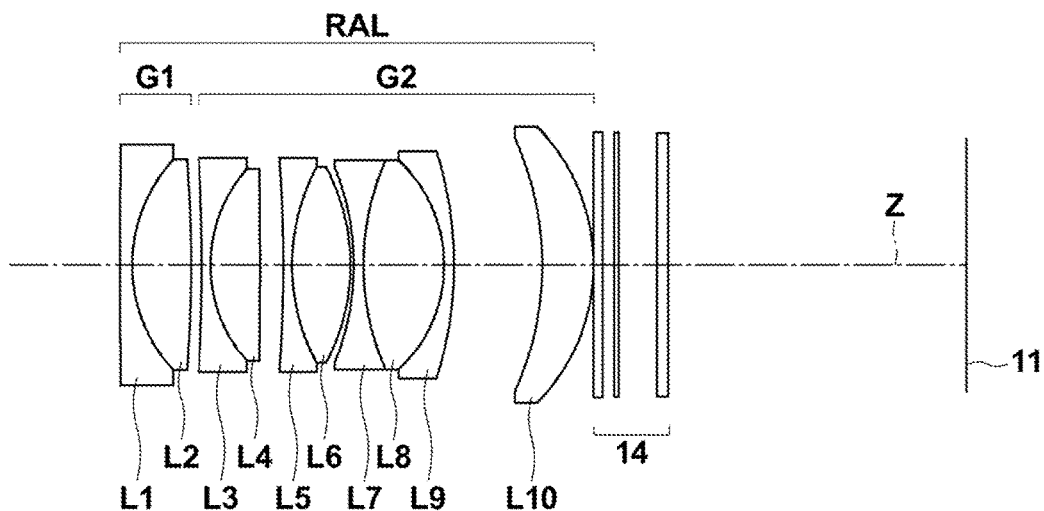
FIG. 4 is a cross section illustrating the configuration of a rear attachment lens in Example 2 of the present invention.
Figure 8:
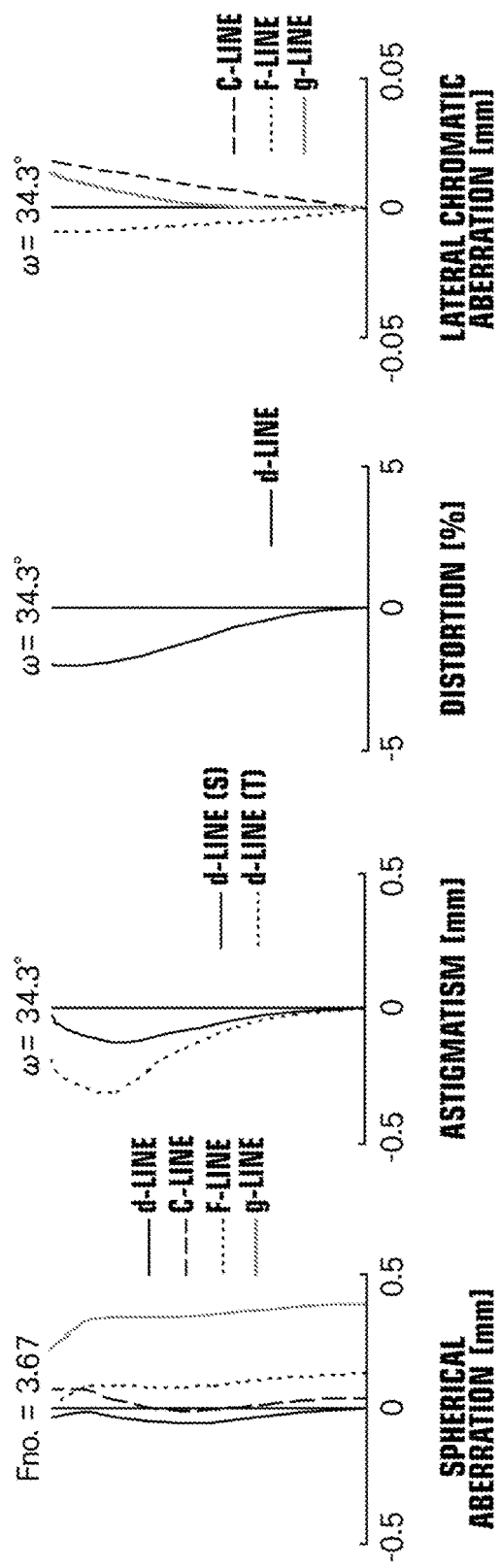
FIG. 8 is aberration diagrams illustrating various aberrations of a lens system in which the rear attachment lens in Example 2 of the present invention has been attached to the main lens, which are a spherical aberration, astigmatism, distortion and a lateral chromatic aberration in this order from the left side of paper.

FIG. 4 is a diagram illustrating the configuration of a rear attachment lens in Example 2. In FIG. 4, the optical member 14 is also illustrated. The schematic configuration of the rear attachment lens in Example 2 is similar to that of Example 1. Table 5 shows basic lens data of the rear attachment lens in Example 2 and the optical member 14. Table 6 shows the specification of a lens system in which the rear attachment lens in Example 2 and the optical member 14, shown in Table 5, are attached to the image side of the main lens. FIG. 8 illustrates aberration diagrams of this lens system.

TABLE 5

EXAMPLE 2

| Si | Ri | Di | Ndj | νdj | θgFj |
|---|---|---|---|---|---|
| 1 | 3072.93691 | 1.367 | 1.53775 | 74.70 | 0.53936 |
| 2 | 17.31214 | 6.630 | 1.53172 | 48.84 | 0.56309 |
| 3 | −157.20016 | 1.250 | | | |
| 4 | −202.64225 | 1.010 | 2.00100 | 29.13 | 0.59952 |
| 5 | 16.21634 | 5.561 | 1.75520 | 27.51 | 0.61033 |
| 6 | −946.89706 | 2.612 | | | |
| 7 | −174.69636 | 1.010 | 2.00100 | 29.13 | 0.59952 |
| 8 | 23.24547 | 6.559 | 1.59270 | 35.31 | 0.59336 |
| 9 | −23.24547 | 0.375 | | | |
| 10 | −29.07838 | 1.110 | 1.71299 | 53.87 | 0.54587 |
| 11 | 29.07838 | 9.074 | 1.59270 | 35.31 | 0.59336 |
| 12 | −16.02098 | 1.100 | 1.80400 | 46.58 | 0.55730 |
| 13 | −42.27893 | 10.000 | | | |
| 14 | −34.35364 | 5.792 | 1.51633 | 64.14 | 0.53531 |
| 15 | −22.05360 | 0.000 | | | |
| 16 | ∞ | 1.000 | 1.51680 | 64.20 | 0.53430 |
| 17 | ∞ | 1.300 | | | |
| 18 | ∞ | 0.500 | 1.51680 | 64.20 | 0.53430 |
| 19 | ∞ | 4.300 | | | |
| 20 | ∞ | 1.300 | 1.51680 | 64.20 | 0.53430 |
| 21 | ∞ | | | | |

TABLE 6

MAIN LENS + EXAMPLE 2

| | |
|---|---|
| IH | 14.040 |
| f | 21.013 |
| Bf | 24.169 |
| FNo. | 3.67 |
| 2ω | 68.6 |
| RATIO OF INCREASING MAGNIFICATION | 2.547 |
| DISTANCE BETWEEN MAIN LENS AND REAR ATTACHMENT LENS | 12.169 |

Example 3

Figure 5:
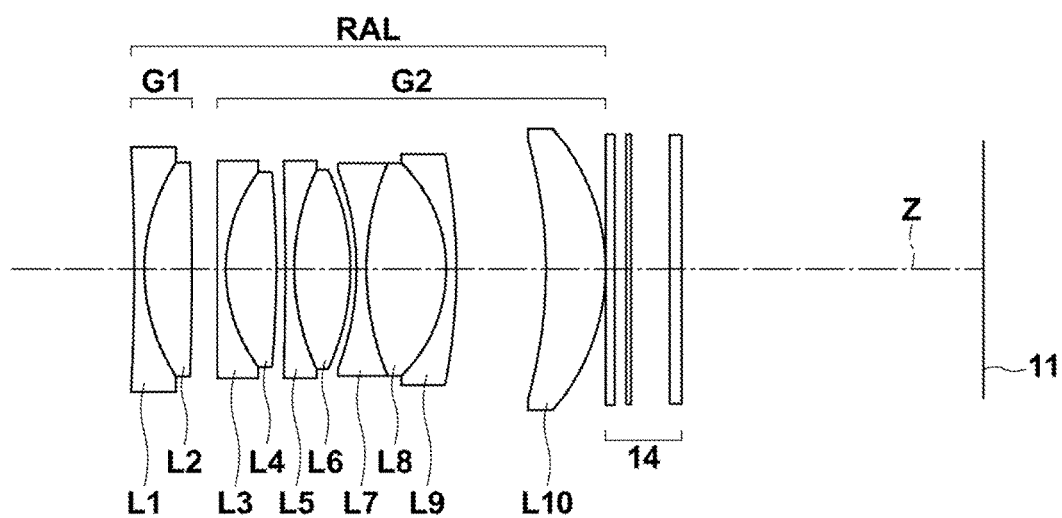
FIG. 5 is a cross section illustrating the configuration of a rear attachment lens in Example 3 of the present invention.
Figure 9:
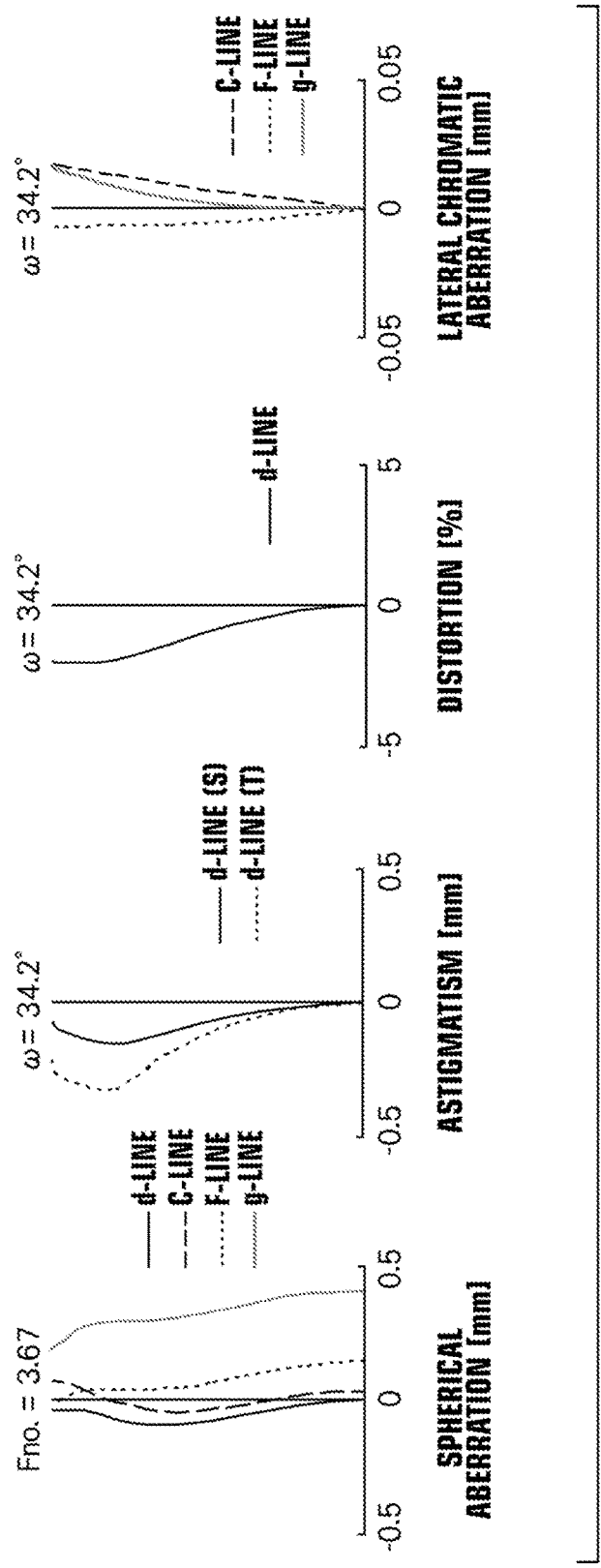
FIG. 9 is aberration diagrams illustrating various aberrations of a lens system in which the rear attachment lens in Example 3 of the present invention has been attached to the main lens, which are a spherical aberration, astigmatism, distortion and a lateral chromatic aberration in this order from the left side of paper.

FIG. 5 is a diagram illustrating the configuration of a rear attachment lens in Example 3. In FIG. 5, the optical member 14 is also illustrated. The schematic configuration of the rear attachment lens in Example 3 is similar to that of Example 1. Table 7 shows basic lens data of the rear attachment lens in Example 3 and the optical member 14. Table 8 shows the specification of a lens system in which the rear attachment lens in Example 3 and the optical member 14, shown in Table 7, are attached to the image side of the main lens. FIG. 9 illustrates aberration diagrams of this lens system.

TABLE 7

EXAMPLE 3

| Si | Ri | Di | Ndj | νdj | θgFj |
|---|---|---|---|---|---|
| 1 | −251.82909 | 1.110 | 1.59282 | 68.63 | 0.54414 |
| 2 | 21.57823 | 5.262 | 1.56732 | 42.82 | 0.57309 |
| 3 | −320.49852 | 2.830 | | | |
| 4 | 2780.87902 | 1.010 | 2.00100 | 29.13 | 0.59952 |
| 5 | 17.89398 | 5.558 | 1.59270 | 35.31 | 0.59336 |

TABLE 7-continued

EXAMPLE 3

| Si | Ri | Di | Ndj | νdj | θgFj |
|---|---|---|---|---|---|
| 6 | −124.90483 | 1.000 | | | |
| 7 | −441.96815 | 1.010 | 1.91082 | 35.25 | 0.58224 |
| 8 | 25.69811 | 6.199 | 1.59270 | 35.31 | 0.59336 |
| 9 | −25.69811 | 0.679 | | | |
| 10 | −30.51206 | 1.110 | 1.71299 | 53.87 | 0.54587 |
| 11 | 30.51206 | 8.846 | 1.59270 | 35.31 | 0.59336 |
| 12 | −16.34748 | 1.102 | 1.80400 | 46.58 | 0.55730 |
| 13 | −66.00744 | 9.990 | | | |
| 14 | −52.24673 | 6.595 | 1.51633 | 64.14 | 0.53531 |
| 15 | −23.44098 | 0.000 | | | |
| 16 | ∞ | 1.000 | 1.51680 | 64.20 | 0.53430 |
| 17 | ∞ | 1.300 | | | |
| 18 | ∞ | 0.500 | 1.51680 | 64.20 | 0.53430 |
| 19 | ∞ | 4.300 | | | |
| 20 | ∞ | 1.300 | 1.51680 | 64.20 | 0.53430 |
| 21 | ∞ | | | | |

TABLE 8

MAIN LENS + EXAMPLE 3

| | |
|---|---|
| IH | 14.040 |
| f | 21.038 |
| Bf | 24.199 |
| FNo. | 3.67 |
| 2ω | 68.4 |
| RATIO OF INCREASING MAGNIFICATION | 2.550 |
| DISTANCE BETWEEN MAIN LENS AND REAR ATTACHMENT LENS | 13.319 |

Table 9 shows values corresponding to conditional expressions (1) through (8) of the rear attachment lenses in Examples 1 through 3. In rows about conditional expression (4), the first through fourth positive lenses from the object side are represented by "POSITIVE LENS 1" through "POSITIVE LENS 4", respectively, and corresponding values for each of the positive lenses are shown. Further, the number of positive lenses satisfying conditional expression (4) included in second lens group G2 is written in the row of the total. Similarly, in rows about conditional expression (5) and rows about conditional expression (6), the first through fourth negative lenses from the object side are represented by "NEGATIVE LENS 1" through "NEGATIVE LENS 4", respectively, and corresponding values for each of the negative lenses are shown. Further, the number of negative lenses satisfying conditional expression (5) included in second lens group G2 and the number of negative lenses satisfying conditional expression (6) included in second lens group G2 are written in the rows of the totals.

TABLE 9

| EXPRESSION NUMBER | CONDITIONAL EXPRESSION | | EXAMPLE 1 | EXAMPLE 2 | EXAMPLE 3 |
|---|---|---|---|---|---|
| (1) | vd1 > 62 | | 68.630 | 74.700 | 68.630 |
| (2) | 0.64 < θgF1 + 0.001625 × vd1 < 0.69 | | 0.6557 | 0.6607 | 0.6557 |
| (3) | Nd1 − Nd2 > 0 | | 0.025 | 0.006 | 0.025 |
| (4) | 0.645 < θgF2p + 0.001625 × vd2p < 0.67 | POSITIVE LENS 1 | 0.6599 | 0.6550 | 0.6507 |
| | | POSITIVE LENS 2 | 0.6507 | 0.6507 | 0.6507 |
| | | POSITIVE LENS 3 | 0.6507 | 0.6507 | 0.6507 |
| | | POSITIVE LENS 4 | 0.6395 | 0.6395 | 0.6395 |
| | | TOTAL | 3 LENSES | 3 LENSES | 3 LENSES |
| (5) | Nd2n > 1.85 | NEGATIVE LENS 1 | 2.001 | 2.001 | 2.001 |
| | | NEGATIVE LENS 2 | 2.001 | 2.001 | 1.911 |
| | | NEGATIVE LENS 3 | 1.713 | 1.713 | 1.713 |
| | | NEGATIVE LENS 4 | 1.804 | 1.804 | 1.804 |
| | | TOTAL | 2 LENSES | 2 LENSES | 2 LENSES |
| (6) | 0.635 < θgF2n + 0.001625 × vd2n < 0.67 | NEGATIVE LENS 1 | 0.6550 | 0.6469 | 0.6469 |
| | | NEGATIVE LENS 2 | 0.6469 | 0.6469 | 0.6395 |
| | | NEGATIVE LENS 3 | 0.6334 | 0.6334 | 0.6334 |
| | | NEGATIVE LENS 4 | 0.6330 | 0.6330 | 0.6330 |
| | | TOTAL | 2 LENSES | 2 LENSES | 2 LENSES |
| (7) | Nd3 − Nd4 > 0 | | 0.2486 | 0.2458 | 0.4083 |
| (8) | 0.55 < Da/Db < 0.70 | | 0.6280 | 0.6427 | 0.6152 |

As these data show, the rear attachment lenses in Examples 1 through 3 can cope with main lenses having an F-number of 1.44. Further, ratios of increasing magnification of about 2.5 times by attachment of the rear attachment lenses are secured. The image size of φ11 mm before attachment is increased to φ28 mm by attachment. Further, high optical performance is achieved by excellently correcting various aberrations, such as chromatic aberrations.

So far, the present invention has been described by using embodiments and examples. However, the present invention is not limited to the aforementioned embodiments nor examples, and various modifications are possible. For example, the values of a curvature radius, a distance between surfaces, a refractive index, an Abbe number, a partial dispersion ratio and the like of each lens are not limited to the values in the aforementioned numerical value examples, and may be other values.

What is claimed is:

1. A rear attachment lens that is attachable to a main lens, which is an imaging optical system, and changes a focal length of an entire lens system, in which the rear attachment lens has been attached to the main lens, to a longer focal length than a focal length of the main lens by being attached to an image side of the main lens,
   the rear attachment lens consisting of:
   a first lens group; and
   a second lens group in this order from an object side,
   wherein the first lens group consists of a negative lens and a positive lens in this order from the object side,
   wherein the second lens group comprises at least one negative lens and at least one positive lens,
   wherein the lens closest to an image side in the second lens group of all of the lenses in the second lens group is a positive lens,
   wherein an Abbe number for the d-line and a partial dispersion ratio between the g-line and the F-line of the negative lens in the first lens group are vd1 and θgF1, respectively, and the following conditional expressions (1) and (2) are satisfied:

$$vd1 > 62 \quad (1);$$

and $$0.64 < \theta gF1 + 0.001625 \times vd1 < 0.69 \quad (2),$$

wherein a refractive index for the d-line of the negative lens in the first lens group is Nd1 and a refractive index for the d-line of the positive lens in the first lens group is Nd2, and the following conditional expression (3) is satisfied:

$$Nd1 - Nd2 > 0 \quad (3).$$

2. A rear attachment lens that is attachable to a main lens, which is an imaging optical system, and changes a focal length of an entire lens system, in which the rear attachment lens has been attached to the main lens, to a longer focal length than a focal length of the main lens by being attached to an image side of the main lens,
   the rear attachment lens consisting of:
   a first lens group; and
   a second lens group in this order from an object side,
   wherein the first lens group consists of a negative lens and a positive lens in this order from the object side,
   wherein the second lens group comprises at least one negative lens and at least one positive lens,
   wherein the lens closest to an image side in the second lens group of all of the lenses in the second lens group is a positive lens,
   wherein an Abbe number for the d-line and a partial dispersion ratio between the g-line and the F-line of the negative lens in the first lens group are vd1 and θgF1, respectively, and the following conditional expressions (1) and (2) are satisfied:

$$vd1 > 62 \quad (1);$$

and $$0.64 < \theta gF1 + 0.001625 \times vd1 < 0.69 \quad (2),$$

wherein Abbe numbers for the d-line and partial dispersion ratios between the g-line and the F-line for positive lenses included in the second lens group are vd2p and θgF2p, respectively, the second lens group including at least two positive lenses having the same or differing values for vd2p and θgF2p, each of the at least two positive lenses satisfying the following conditional expression (4):

$$0.645 < \theta gF2p + 0.001625 \times vd2p < 0.67 \quad (4).$$

3. A rear attachment lens that is attachable to a main lens, which is an imaging optical system, and changes a focal length of an entire lens system, in which the rear attachment lens has been attached to the main lens, to a longer focal length than a focal length of the main lens by being attached to an image side of the main lens, the rear attachment lens consisting of:
　a first lens group; and
　a second lens group in this order from an object side,
wherein the first lens group consists of a negative lens and a positive lens in this order from the object side,
wherein the second lens group comprises at least one negative lens and at least one positive lens,
wherein the lens closest to an image side in the second lens group of all of the lenses in the second lens group is a positive lens,
wherein an Abbe number for the d-line and a partial dispersion ratio between the g-line and the F-line of the negative lens in the first lens group are vd1 and θgF1, respectively, and the following conditional expressions (1) and (2) are satisfied:

$$vd1 > 62 \quad (1);$$

and $$0.64 < \theta gF1 + 0.001625 \times vd1 < 0.69 \quad (2),$$

wherein refractive indexes for the d-line, Abbe numbers for the d-line and partial dispersion ratios between the g-line and the F-line for negative lenses included in the second lens group are Nd2n, vd2n and θgF2n, respectively, the second lens group including at least two negative lenses having the same or differing values for Nd2n, vd2n and θgF2n, each of the at least two negative lenses satisfying both of the following conditional expressions (5) and (6):

$$Nd2n > 1.85 \quad (5);$$

and $$0.635 < \theta gF2n + 0.001625 \times vd2n < 0.67 \quad (6).$$

4. The rear attachment lens, as defined in claim 2, wherein a refractive index for the d-line of the negative lens closest to the object side in the second lens group of all of the negative lenses in the second lens group is Nd3, and a refractive index for the d-line of the positive lens closest to the object side of all of the positive lenses in the second lens group is Nd4, and the following conditional expression (7) is satisfied:

$$Nd3 - Nd4 > 0 \quad (7).$$

5. The rear attachment lens, as defined in claim 2, wherein the second lens from the image side in the second lens group is a negative meniscus lens with its convex surface facing the image side.

6. The rear attachment lens, as defined in claim 2, wherein the lens that is closest to the image side in the second lens group is a positive meniscus lens with its convex surface facing the image side.

7. The rear attachment lens, as defined in claim 2, wherein a length on an optical axis from a lens surface closest to the object side in the second lens group to an image-side lens surface of a second lens from the image side in the second lens group is Da and a length on an optical axis from a lens surface closest to the object side in the second lens group to a lens surface closest to the image side in the second lens group is Db, and the following conditional expression (8) is satisfied:

$$0.55 < Da/Db < 0.70 \quad (8).$$

8. The rear attachment lens, as defined in claim 1, wherein the following conditional expression (2-1) is satisfied:

$$0.64 < \theta gF1 + 0.001625 \times vd1 < 0.675 \quad (2-1).$$

9. The rear attachment lens, as defined in claim 2, wherein the second lens group consists of four negative lenses and four positive lenses.

10. The rear attachment lens, as defined in claim 2, wherein the second lens group includes a three-element cemented lens having negative refractive power, as a whole, in which a negative lens, a positive lens, and a negative lens are cemented together in this order from the object side.

11. The rear attachment lens, as defined in claim 2, wherein the second lens group consists of:
　a cemented lens of two lenses cemented together, one of which is a negative lens, and the other one of which is a positive lens;
　a cemented lens of two lenses cemented together, one of which is a negative lens, and the other one of which is a positive lens;
　a three-element cemented lens of a negative lens, a positive lens, and a negative lens cemented together in this order from the object side; and
　a positive lens in this order from the object side.

12. The rear attachment lens, as defined in claim 11, wherein each of the first cemented lens and the second cemented lens from the object side in the second lens group is a cemented lens of a negative lens and a positive lens cemented together in this order from the object side.

13. The rear attachment lens, as defined in claim 1, wherein Abbe numbers for the d-line and partial dispersion ratios between the g-line and the F-line for positive lenses included in the second lens group are vd2p and θgF2p, respectively, the second lens group including at least two positive lenses having the same or differing values for vd2p and θgF2p, each of the at least two positive lenses satisfying the following conditional expression (4):

$$0.645 < \theta gF2p + 0.001625 \times vd2p < 0.67 \quad (4).$$

14. The rear attachment lens, as defined in claim 1, wherein refractive indexes for the d-line, Abbe numbers for the d-line and partial dispersion ratios between the g-line and the F-line for negative lenses included in the second lens group are Nd2n, vd2n and θgF2n, respectively, the second lens group including at least two negative lenses having the same or differing values for Nd2n, vd2n and θgF2n, each of the at least two negative lenses satisfying both of the following conditional expressions (5) and (6):

$$Nd2n > 1.85 \quad (5);$$

and $$0.635 < \theta gF2n + 0.001625 \times vd2n < 0.67 \quad (6).$$

15. The rear attachment lens, as defined in claim 2, wherein refractive indexes for the d-line, Abbe numbers for the d-line and partial dispersion ratios between the g-line and the F-line for negative lenses included in the second lens group are Nd2n, νd2n and θgF2n, respectively, the second lens group including at least two negative lenses having the same or differing values for Nd2n, νd2n and θgF2n, each of the at least two negative lenses satisfying both of the following conditional expressions (5) and (6):

$$Nd2n > 1.85 \quad (5);$$

and $$0.635 < \theta gF2n + 0.001625 \times \nu d2n < 0.67 \quad (6).$$

16. The rear attachment lens, as defined in claim 3, wherein a refractive index for the d-line of the negative lens closest to the object side in the second lens group of all of the negative lenses in the second lens group is Nd3, and a refractive index for the d-line of the positive lens closest to the object side of all of the positive lenses in the second lens group is Nd4, and the following conditional expression (7) is satisfied:

$$Nd3 - Nd4 > 0 \quad (7).$$

17. The rear attachment lens, as defined in claim 3, wherein the second lens from the image side in the second lens group is a negative meniscus lens with its convex surface facing the image side.

18. The rear attachment lens, as defined in claim 3, wherein the lens that is closest to the image side in the second lens group is a positive meniscus lens with its convex surface facing the image side.

19. The rear attachment lens, as defined in claim 3, wherein a length on an optical axis from a lens surface closest to the object side in the second lens group to an image-side lens surface of a second lens from the image side in the second lens group is Da and a length on an optical axis from a lens surface closest to the object side in the second lens group to a lens surface closest to the image side in the second lens group is Db, and the following conditional expression (8) is satisfied:

$$0.55 < Da/Db < 0.70 \quad (8).$$

20. The rear attachment lens, as defined in claim 3, wherein the second lens group includes a three-element cemented lens having negative refractive power, as a whole, in which a negative lens, a positive lens, and a negative lens are cemented together in this order from the object side.

* * * * *